(12) United States Patent
Shimizu

(10) Patent No.: US 7,692,416 B2
(45) Date of Patent: Apr. 6, 2010

(54) VOLTAGE UP-AND-DOWN DC-DC CONVERTOR

(75) Inventor: Shinya Shimizu, Hyogo-ken (JP)

(73) Assignee: Ricoh Company Company, Ltd., Tokyo (JP)

(*) Notice: Subject to any disclaimer, the term of this patent is extended or adjusted under 35 U.S.C. 154(b) by 201 days.

(21) Appl. No.: 11/898,625

(22) Filed: Sep. 13, 2007

(65) Prior Publication Data
US 2008/0068869 A1    Mar. 20, 2008

(30) Foreign Application Priority Data
Sep. 14, 2006    (JP) .............................. 2006-249606

(51) Int. Cl.
G05F 1/40    (2006.01)
G05F 1/10    (2006.01)

(52) U.S. Cl. ...................................... 323/271; 323/222

(58) Field of Classification Search ................. 323/222, 323/223, 225, 268, 271, 272, 282
See application file for complete search history.

(56) References Cited

U.S. PATENT DOCUMENTS

| | | | |
|---|---|---|---|
| 5,355,098 A | 10/1994 | Iwasaki et al. | |
| 5,828,384 A | 10/1998 | Iwasaki et al. | |
| 5,870,074 A | 2/1999 | Iwasaki et al. | |
| 5,929,615 A * | 7/1999 | D'Angelo et al. | ............ 323/224 |
| 6,515,463 B2 * | 2/2003 | Ling | ........................... 323/315 |
| 7,161,854 B2 | 1/2007 | Iwasaki et al. | |
| 7,443,147 B2 * | 10/2008 | Kasai et al. | ................. 323/259 |

FOREIGN PATENT DOCUMENTS

| | | |
|---|---|---|
| JP | 2004-328964 | 11/2004 |
| JP | 2005-198411 | 7/2005 |

OTHER PUBLICATIONS

U.S. Appl. No. 08/667,425.

* cited by examiner

*Primary Examiner*—Matthew V Nguyen
(74) *Attorney, Agent, or Firm*—Dickstein Shapiro LLP

(57) ABSTRACT

A voltage up and down synchronization and rectification type DC-DC converter goes up and down an input voltage using an inductor. The voltage up and down synchronization and rectification type DC-DC converter comprises a voltage up and down use rectification circuit including a pair of PMOS and NMOS transistors connected in parallel to each other.

3 Claims, 2 Drawing Sheets

VOLTAGE UP-AND-DOWN DC-DC CONVERTOR

CROSS REFERENCE TO RELATED APPLICATION

This application claims priority under 35 USC §119 to Japanese Patent Application No. 2006-249606, filed on Sep. 14, 2006, the entire contents of which are herein incorporated by reference.

BACKGROUND OF THE INVENTION

1. Field of the Invention

The present invention relates to a synchronization and rectification type voltage going up and down DC-DC converter, and in particular, to that capable of changing and setting an output voltage close to zero as the lowest.

2. Discussion of the Background Art

A compact mobile instrument, such as a mobile phone, etc., is widely spreading, recently. As a power for the compact mobile instrument, a secondary battery is generally used. To downsize and elongate a usage time period of the secondary battery as long as possible, it has been attempted to sophisticate the battery while saving power.

To use longer while downsizing the battery, it is preferable to broaden an available voltage arrange of the battery as much as possible.

Then, a voltage up-and-down DC-DC converter having a wide range of input voltages is utilized in a power source circuit.

Due to the wide range, the voltage up-and-down DC-DC converter has an advantage of handling various input power sources, such as a battery, an AC adapter, etc.

The voltage up-and-down DC-DC converter with an inductor is widely used as a power source in an instrument having a battery because of its circuit simplicity and high efficiency as described in Japanese Patent Application Laid Open Nos. 2004-328964 and 2005-198411.

FIG. 2 illustrates only an output circuit section of the voltage up-and-down DC-DC converter of the Japanese Patent Application 2004-328964.

As shown, M1 to M4 denote switching transistors (PMOS) for voltage going down use, a synchronization and rectification use transistor (NMOS) for voltage going down use, a switching transistor (NMOS) for voltage going up use, and a synchronization and rectification use transistor (NMOS) for voltage going up use, respectively.

Each of gates of the transistors M1 to M4 is connected to a predriver 11, and receives a control signal from a control circuit, not shown.

When an input voltage goes down, the switching transistor M3 is always turned off, because its gate receives a low level signal. Whereas the synchronization and rectification use transistor M4 is always turned on at the time, because its gate receives a high level signal.

Each of the transistors M1 and M2 receives, through its gates, low and high level signals in a pulse state to be turned on and off in accordance with an output voltage Vout. However, the transistors M1 and M2 aren't turned on, simultaneously.

When an input voltage goes up, the transistor M1 is always turned on, because its gate receives a low level signal. Whereas the transistor M2 is always turned off at the time, because its gate receives a low level signal. Each of the transistors M3 and M4 receives, through its gates, low and high level signals in a pulse state to be turned on and off in accordance with an output voltage. The transistors M3 and M4 are not simultaneously turned on, however.

Since the NMOS transistor is utilized for the synchronization and the rectification use transistor M4 in this output circuit, a gate voltage higher than the sum of an output voltage "Vout" and a threshold voltage of the NMOS transistor M4 is needed to turn on the transistor. Accordingly, a power source for the predriver 11 needs a higher voltage than the gate voltage.

Thus, no problem occurs when a power is supplied to the predriver 11 from the input voltage "Vin" higher than an output voltage "Vout", specifically when an input voltage goes down. However, when the input voltage "Vin" is lower than the output voltage "Vout", specifically when an input voltage goes up, the synchronization and rectification use transistor M4 can't be turned on. Thus, a power should be supplied from another source higher than the output voltage Vout.

Thus, a higher voltage than the output voltage Vout is created as a power source for the predriver by pressurizing an input voltage Vin by means of a charge pump circuit or the like.

FIG. 3 illustrates only an output circuit section of the voltage up-and-down DC-DC converter described in the Japanese Patent Application 2004-328964, wherein like reference numerals and marks designate corresponding parts in FIG. 2. A significant difference from FIG. 2 is that a PMOS transistor for a synchronization and rectification use transistor M4 is employed for voltage going up use.

Each of gates of a voltage going down use switching transistor M1 (PMOS) and a voltage going down circuit use synchronization and rectification use transistor M2 (NOMOS) is connected to a voltage going down use driver 21. Similarly, each of gates of the voltage going up use switching transistor M3 (NMOS) and the voltage going up use synchronization and rectification use transistor M4 (POMOS) is connected to a voltage going up circuit use driver 22. Similar to those as described with reference to FIG. 2, a control circuit, not shown, applies a control signal to each of the gates in accordance with a situation if an input voltage goes up or down.

Since the voltage going up use synchronization and rectification use transistor M4 is formed from the PMOS transistor, a high voltage is not needed for a gate voltage to turn on the transistor M4.

However, when an input voltage goes down and an output voltage Vout is lower than a threshold voltage of the synchronization and rectification use transistor M4 (PMOS), the transistor M4 is not turned on even if the gate voltage of the synchronization and rectification use transistor M4 is decreased down to zero. Thus, such a DC-DC converter is not suitable where an input voltage goes down and the output voltage Vout is low.

SUMMARY OF THE INVENTION

Accordingly, an object of the present invention is to improve such background arts technologies and provides a new and novel voltage up and down type DC-DC converter. Such a new and novel voltage up and down type DC-DC converter goes up and down an input voltage using an inductor. The voltage up and down synchronization and rectification type DC-DC converter comprises a voltage up and down use rectification circuit including a pair of PMOS and NMOS transistors connected in parallel to each other.

In another embodiment, the driving device includes a first driving member that causes a gate voltage of the NMOS transistor to be a high level lower than the input voltage both of when an input voltage goes up and the NMOS transistor is turned on, and when an input voltage goes down. The first driving member causes the gate voltage of the NMOS transistor to be a low level when an input voltage goes up and the NMOS transistor is turned off. A second driving member is also included to cause a gate voltage of the PMOS transistor to be a low level both of when an input voltage goes up and the PMOS transistor is turned on and when an input voltage goes down. The second driving member causes the gate voltage of the PMOS transistor to be a high level lower than the output voltage when an input voltage goes down and the PMOS transistor is turned off.

In yet another embodiment, the first driving member includes a first inverter connected to the gate of the NMOS transistor and supplied with the input voltage, a second inverter connected to the first inverter and supplied with the input voltage, and a third inverter connected to the second inverter and supplied with the input voltage. The third inverter receives on/off control signals controlling the NMOS and PMOS transistors. The second driving member includes a fourth inverter connected to the gate of the PMOS transistor and supplied with the output voltage, and a level shift circuit connected between the fourth inverter and the third inverter.

In yet another embodiment, the first driving member includes a first inverter connected to the gate of the NMOS transistor and supplied with the input voltage, a second inverter connected to the first inverter and supplied with the input voltage, and a third inverter connected to the second inverter and supplied with the input voltage. The third inverter receives on/off control signals controlling the NMOS and PMOS transistors. The second driving member includes a fourth inverter connected to the gate of the PMOS transistor and supplied with the output voltage, and a level shift circuit connected between the fourth inverter and the third inverter.

In yet another embodiment, a control device is provided to change the output voltage, and approximates the output voltage to the lowest level of about a threshold voltage of the PMOS transistor or a level less than the threshold voltage.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein.

PREFERRED EMBODIMENTS OF THE PRESENT INVENTION

Figure 1:
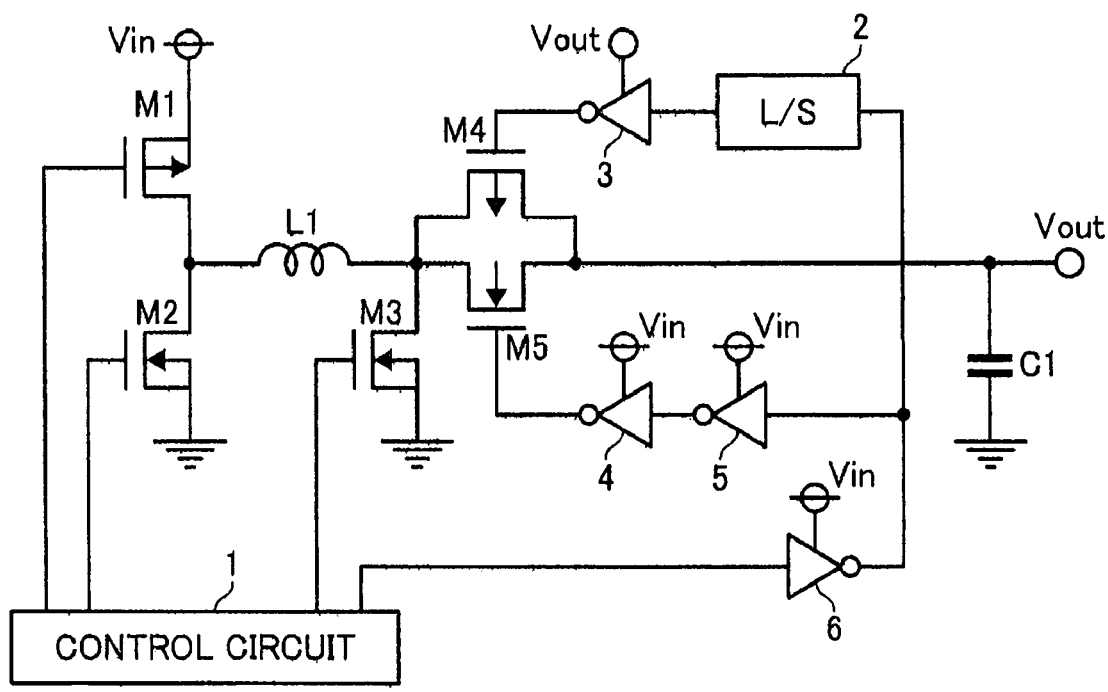
FIG. 1 is a block chart illustrating an exemplary configuration of a voltage going up use DC-DC converter, in particular, an output section thereof.
Figure 2:
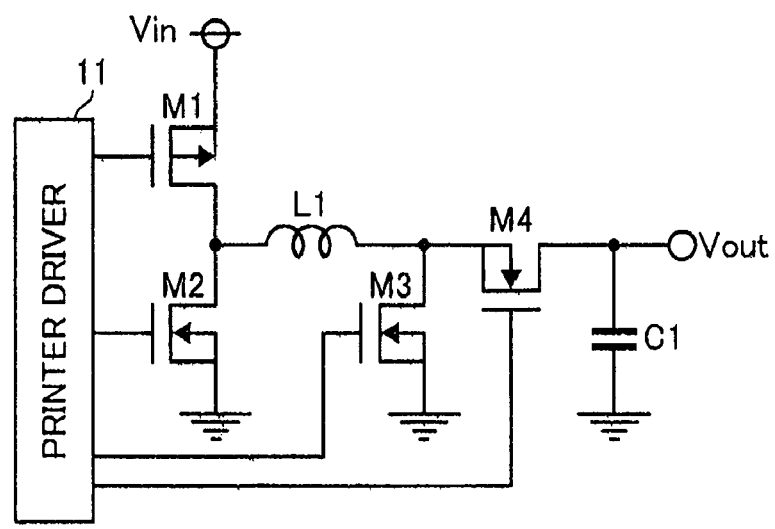
FIG. 2 is a block chart illustrating a configuration of a first conventional voltage going up and down use DC-DC converter.
Figure 3:
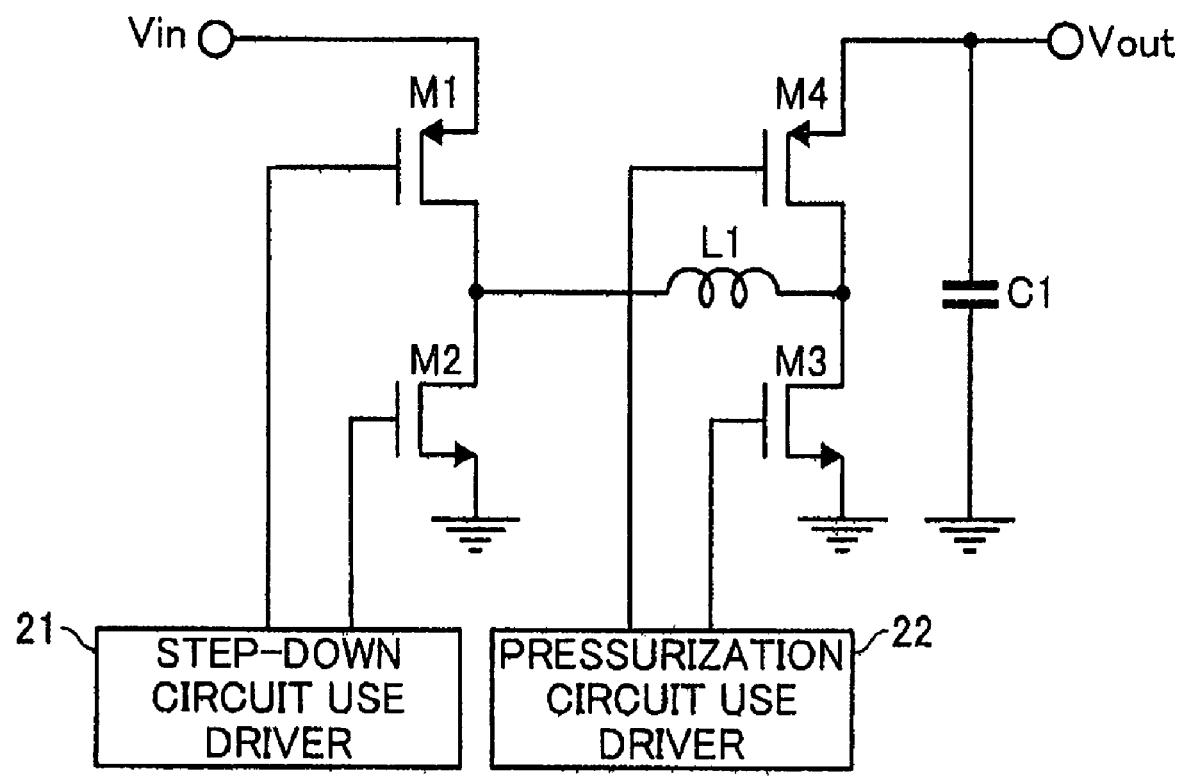
FIG. 3 is a block chart illustrating a configuration of a second conventional voltage going us and down use DC-DC converter.

Referring now to the drawing, wherein like reference numerals designate identical or corresponding parts throughout several views, in particular in FIG. 1, an exemplary configuration of an output section of a up-and-down use DC-DC converter is illustrated.

The output section includes a control circuit 1, a voltage going down use switching transistor M1, a voltage going down use synchronization and rectification use transistor M2, a voltage going up use switching transistor M3, a plurality of synchronization and rectification use transistors M4 and M5, an inductor L1, a plurality of inverters 3 to 6, a level shift circuit 2, and a condenser C1.

The control circuit 1 outputs a gate signal to turn on/off the respective MOS transistors M1 to M5. Specifically, the control circuit 1 outputs gate signals in a pulse state to always turn off the voltage going up use switching transistor M3, and always turn on the voltage going up use synchronization and rectification use transistors M4 and M5, while turning on/off the voltage going down use switching transistor M1 and the voltage going down use synchronization and rectification use transistor M2 in accordance with an output voltage Vout when an input voltage goes down. These transistors M1 and M2 are controlled not to be simultaneously turned on.

Whereas, the control circuit 1 outputs the other gate signals in a pulse state to always turn on the voltage going down use switching transistor M1, and always turn off the voltage going down use synchronization and rectification use transistor M2, while turning on/off the voltage going up use switching transistor M3 and synchronization and rectification use transistors M4 and M5 in accordance with an output voltage Vout when an input voltage goes up. Such turn on/off control inhibits the transistors M3 and M4 or M5 to be simultaneously turned on.

The voltage going down use switching transistor M1 is formed from a PMOS transistor.

The voltage going down use synchronization and rectification use transistor M2 is formed from a NMOS transistor. Each of the gates of these transistors M1 and M2 is connected to the control circuit 1.

Further, the voltage going up use switching transistor M3 is formed from a NMOS transistor, and is connected to the control circuit 1 though its gate.

The transistors M4 and M5 are used as a voltage going up use synchronization and rectification use transistor. The voltage going up use synchronization and rectification use transistor M4 includes a PMOS transistor, while the voltage going up use synchronization and rectification use transistor M5 includes a NMOS transistor. These transistors M4 and M5 are connected in parallel.

A control signal is applied from the control circuit 1 to the gate of the synchronization and rectification use transistor M4 via a second driving device formed from a plurality of inverters 3 and 6 and the level shift circuit 2.

Since the output voltage Vout is applied to the inverter 3, a high level of the inverter 3 almost amounts to the output voltage Vout and a low level thereof, zero volts, respectively.

Since the input voltage Vin is applied to the inverter 6, the level shift circuit 2 serves as an interface connecting an output of the inverter 6 to an input of the inverter 3.

A control signal is applied to the gate of the voltage going up use synchronization and rectification use transistor M5 from the control circuit 1 via a first driving device formed from the inverters 6, 5, and 4.

Since the input voltage Vin is applied to the inverters 6, 5, and 4, a high level of the inverter 4 almost amounts to the input voltage Vin and a low level thereof, zero volts, respectively.

The control circuit 1 outputs signals to respective gates of the transistors M1 to M5 to control an output voltage Vout of the DC-DC converter to vary on one hand. The control circuit 1, on the other hand, sets the minimum output voltage Vmin to a level adjacent to or less than a threshold voltage of the voltage going up use synchronization and rectification use PMOS transistor M4, while setting the maximum output voltage Vmax to a level higher than the input voltage Vin.

When the output voltage Vout is higher than the input voltage Vin, specifically, in a voltage going up operation, the control circuit 1 outputs a signal in a pulse state, to turn on and off the synchronization and rectification use PMOS transistor M4 and the synchronization and rectification use NMOS transistor M5 in accordance with an output voltage Vout.

However, when turn on control is executed, specifically when a low level signal is outputted from the control circuit 1 to the inverter 6, the synchronization and rectification use NMOS transistor M5 is not turned on.

Because, even when the gate voltage applied from the inverter 4 becomes a high level, the gate voltage (a high level) of the synchronization and rectification use NMOS transistor M5 only increases up to the input voltage Vin, and thus is lower than the output voltage Vout.

However, the synchronization and rectification use PMOS transistor M4 can completely be turned on (i.e., a turn on/off control). Because, when turn on control is executed, the gate voltage of the synchronization and rectification use PMOS transistor M4 decreases down to zero (i.e., a low level) via the inverters 6 and 3, and the output voltage Vout is larger enough than the threshold voltage of the synchronization and rectification use PMOS transistor M4. Thus, synchronization and rectification can be accomplished when an input voltage goes up.

Further, when turning off control is executed, specifically when a high level signal is outputted to an inverter 6 from the control circuit 1, the gate voltage of the synchronization and rectification use PMOS transistor M4 increases up to the output voltage Vout via the inverters 6 and 3 to be a high level, so that the synchronization and rectification use PMOS transistor M4 is turned off. Further, the gate voltage of the synchronization and rectification use NMOS transistor M5 decreases down to zero via the inverters 6, 5 and 4, thereby becoming a lower level, so that the synchronization and rectification use NMOS transistor M5 is turned off.

Further, when an input voltage goes down, a (low level) signal is outputted to the inverter 6 from the control circuit 1 so as to always turn on the synchronization and rectification use PMOS transistor M4 and the synchronization and rectification use NMOS transistor M5. Simultaneously, a low level signal is applied to the gate of the synchronization and rectification use PMOS transistor M4 via the inverters 6 and 3. Further, a high level signal is applied to the gate of the synchronization and rectification use NMOS transistor M5, thereby both of the transistors M4 and M5 are turned on except for the followings.

Specifically, when the output voltage Vout is set to a level almost same to a threshold voltage of the synchronization and rectification use PMOS transistor M4 at around zero or less than zero, the synchronization and rectification use PMOS transistor M4 cannot be turned on even if the inverter 3 outputs a low level. Otherwise, a turn on resistance remains high even when the synchronization and rectification use PMOS transistor M4 is turned on.

However, the synchronization and rectification use NMOS transistor M5 can be completely turned on, because the gate voltage of the synchronization and rectification use NMOS transistor M5 is a high level and is almost as same as the input voltage Vin. Thus, the inductor L1, the condenser C1, and the output terminal can be always connected with each other when an input voltage goes down.

Thus, when the output voltage Vout is higher than the input voltage Vin, specifically, when an input voltage goes up, turning on/off control (i.e., synchronization and rectification) of the synchronization and rectification use PMOS transistor M4 is possible. Whereas, when an input voltage goes down, in particular when the output voltage Vout is close to zero, all time turn on control of the synchronization and rectification use NMOS transistor M5 is available. Further, when an input voltage goes down, and when the output voltage Vout is other than the above, all time turn on control of both of the synchronization and rectification use PMOS transistor M4 and the synchronization and rectification use NMOS transistor M5 are available.

Thus, according to one embodiment of the present invention, a private use power source using a charge pump for gate driving use is needless when an input voltage goes up. Further, a voltage up and down DC-DC converter having a wide range of voltages and capable of setting the output voltage Vout to almost zero when an input voltage goes down can be obtained with a simple circuit.

As mentioned heretofore, since the voltage going up DC-DC converter of this embodiment employs a circuit including the PMOS and NMOS transistors connected in parallel to each other as a voltage going up use rectification element, the NMOS transistor is turned off, and the PMOS transistor is turned on and off (e.g. synchronization and rectification) in accordance with an output voltage when an input voltage goes up, while always turning on the NMOS transistor when an input voltage goes down, a special power source for driving the voltage going up use synchronization and rectification use transistor can be omitted.

As a result, a voltage going up and down DC-DC converter having a wide range of output voltages can be obtained with a simple circuit.

Further, an output voltage of the voltage up and down DC-DC converter varies. The minimum output voltage can be set to the same or less than the threshold voltage of the PMOS transistor. Further, since an output voltage serves as a power source for a circuit that drives a gate of a PMOS transistor, and an input voltage serves as a power source for a circuit that drives a gate of a NMOS transistor, an extra power source other than those can be omitted.

Although the above-mentioned embodiment employs a PMOS transistor as a voltage going down use switching transistor M1, the present invention can be applied to that employing a NMOS transistor.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A voltage up and down synchronization and rectification type DC-DC converter for going up and down an input voltage using an inductor, said voltage up and down synchronization and rectification type DC-DC converter comprising:
a control circuit configured to output a control signal;
a voltage up and down use rectification circuit configured to operate in accordance with the control signal, said voltage up and down use rectification circuit including a pair of PMOS and NMOS transistors connected in parallel to each other; and
a driving device configured to turn on the NMOS transistor and turn on and off the PMOS transistor when an input voltage goes up, said driving device turning on at least the NMOS transistor when an input voltage goes down, wherein said driving device includes:
a first driving member configured to cause a gate voltage of the NMOS transistor to be a high level lower than the input voltage both of when an input voltage goes up and the NMOS transistor is turned on, and when an input voltage goes down, said first driving member causing the gate voltage of the NMOS transistor to be a low level when an input voltage goes up and the NMOS transistor is turned off; and a second driving member configured to cause a gate voltage of the PMOS transistor to be a low level both of when an input voltage goes up and the PMOS transistor is turned on and when an input voltage goes down, said second driving member causing the gate voltage of the PMOS transistor to be a high level lower than the output voltage when an input voltage goes down and the PMOS transistor is turned off.

2. The voltage up and down synchronization and rectification type DC-DC converter as claimed in claim 1, wherein said first driving member includes;

a first inverter connected to the gate of the NMOS transistor and supplied with the input voltage, a second inverter connected to the first inverter and supplied with the input voltage, and a third inverter connected to the second inverter and supplied with the input voltage, said third inverter receiving on/off control signals controlling the NMOS and PMOS transistors; and wherein said second driving member includes a fourth inverter connected to the gate of the PMOS transistor and supplied with the output voltage, and a level shift circuit connected between the fourth inverter and the third inverter.

3. The voltage up and down synchronization and rectification type DC-DC converter as claimed in claim 1, further comprising a control device configured to change said output voltage, said control device approximating the output voltage to the lowest level of about a threshold voltage of the PMOS transistor or a level less than the threshold voltage.

* * * * *